(12) United States Patent
Chen et al.

(10) Patent No.: US 7,450,771 B2
(45) Date of Patent: Nov. 11, 2008

(54) PRE-COMPRESSION RATE-DISTORTION OPTIMIZATION METHOD FOR JPEG 2000

(75) Inventors: Liang-Gee Chen, Taipei (TW); Hung-Chi Fang, Taipei (TW); Yu-Wei Chang, Taipei (TW)

(73) Assignee: National Taiwan University, Taipei (TW)

( * ) Notice: Subject to any disclaimer, the term of this patent is extended or adjusted under 35 U.S.C. 154(b) by 880 days.

(21) Appl. No.: 10/888,733

(22) Filed: Jul. 9, 2004

(65) Prior Publication Data

US 2006/0008162 A1 Jan. 12, 2006

(51) Int. Cl.
*G06K 9/36* (2006.01)
(52) U.S. Cl. .................... 382/240; 382/232
(58) Field of Classification Search ............. 382/232, 382/233, 239, 240; 375/240.03, 240.11, 375/240.19
See application file for complete search history.

(56) References Cited

U.S. PATENT DOCUMENTS

| | | | | |
|---|---|---|---|---|
| 6,760,482 | B1* | 7/2004 | Taubman | 382/240 |
| 7,023,922 | B1* | 4/2006 | Xu et al. | 375/240.19 |
| 2003/0035478 | A1* | 2/2003 | Taubman | 375/240.11 |
| 2006/0239345 | A1* | 10/2006 | Taubman et al. | 375/240.03 |

* cited by examiner

*Primary Examiner*—Duy M Dang
(74) *Attorney, Agent, or Firm*—Rabin & Berdo, P.C.

(57) ABSTRACT

A method of optimizing a compression of a still image in JPEG 2000 format, which includes the steps of: (a) dividing an image into a predetermined numbers of tiles each having a predetermined numbers of tile pixels; (b) decomposing each of the tiles into a predetermined number of subbands by Discrete Wavelet Transform (DWT); (c) partitioning each of the subbands into a predetermined number of code-blocks which are arranged into a plurality of bit-planes respectively; (d) minimizing a total rate with a given predetermined total distortion of image so as to pre-determine an optimal truncation point for each of the code-blocks; (e) truncating a predetermined part of the DWT coefficients for each of the code-blocks so as to reduce computational resource; and (f) encoding each of the code-blocks by embedded block-coding to form an embedded code-stream having a plurality of code passes.

19 Claims, 4 Drawing Sheets

PRE-COMPRESSION RATE-DISTORTION OPTIMIZATION METHOD FOR JPEG 2000

BACKGROUND OF THE PRESENT INVENTION

1. Field of Invention

The present invention relates to a method of processing an image, and more particularly to a method of pre-compressing rate-distortion optimization for JPEG 2000 images, which can reduce the computational power of the entropy encoder and unnecessary memory requirement for a code-steam without losing the quality of the JPEG 2000 image.

2. Description of Related Arts

Joint Photographics Experts Group (JPEG) technique has popularly been utilized for images processing in computer environment. JPEG 2000 is the new still imaging coding standard in next generation. The performance of JPEG 2000 is superior to JPEG at all bit rate. However, the computational complexity of JPEG 2000 is much higher than that of JPEG.

Accordingly, there are two major parts in JPEG 2000: Discrete Wavelet Transform (DWT), and Embedded Block Coding with Optimized Truncation (EBCOT). In general, quantization is not used to control the rate of code-stream in JPEG 2000 encoder. It is applied to adjust weights of different frequency bands based on the filter bank and decomposition level of DWT, and no quantization is used at reversible wavelet transform mode. After DWT and quantization, the coefficients are partitioned into code-blocks, which are encoded by EBCOT. The most complex part in JPEG 2000 is EBCOT. EBCOT is a two-tiered algorithm. Tier-1 is embedded block coder, which utilizes context-based arithmetic coding to encode each code-block into independent embedded bit-stream. Tier-2 is post-compression rate-distortion optimization algorithm. EBCOT Tier-1 is the most complex part of JPEG 2000, which consumes more than 50% of total computation power. Reducing its computation time can significantly decrease the total run time of JPEG 2000 encoder.

Most still image coding standard, including JPEG, use quantization scheme to achieve rate control. However, this scheme cannot provide best quality at a given bit rate and get precise rate in one iteration. Instead of using quantization scheme to perform the rate control, JPEG 2000 uses a better scheme to control the rate by EBCOT Tier-2 processing. It uses Lagrange optimization to precisely control the bit rate and guarantees the best quality at specific bit rate. However, in the rate-distortion optimization, all transformed coefficients must be processed by EBCOT Tier-1 to get the rate and distortion information. In most cases, most compressed bit-streams generated by EBCOT Tier-1 will be discarded through the procedure of EBCOT Tier-2. The memory spent to store the discarded bit-stream and computations used are all wasted. Some previous works focus on memory and power reduction for post-compression optimization scheme. For example, Chang et al., use EBCOT Tier-2 feedback control to terminate redundant computation of EBCOT Tier-1. Computation time of EBCOT Tier-1 can be reduced to 40% and 20% at medium to high compression rate. Yeung proposed a scheme based on priority scanning. It is to encode the truncation points in a different order by priority information and terminate block coding adequately. The computational cost and memory requirement can be reduced by 52% and 71% respectively in the case of 0.25 bpp.

SUMMARY OF THE PRESENT INVENTION

A main object of the present invention is to provide a method of optimization compression process of JPEG 2000 images which utilizes pre-compression rate-distortion optimization for compressing the JPEG 2000 images so as to minimize system resources and processing time.

Another object of the present invention is to provide a method of pre-compression rate-distortion optimization for JPEG2000, which is capable of minimizing bit rate at given image distortion by selecting truncation points before entropy coding, so as to minimize wasted computational time and unnecessary memory requirement as compared to conventional post-compression rate distortion optimization algorithm.

Another object of the present invention is to provide a method of pre-compression rate-distortion optimization for JPEG 2000 which is simple in logic yet substantially minimize the adverse effect which may have in conventional post-compression rate-distortion optimization for conventional JPEG 2000 images.

Another object of the present invention is to provide a method of pre-compressing rate distortion optimization for JPEG 2000 which does not significantly degrade the quality of the images so as to maximize a utilization performance of the present invention.

Another object of the present invention is to provide a method of pre-compression rate-distortion optimization for JPEG 2000 which is compatible with consistent in most of the image procession system for real-time image compression products, such as digital cameras, digital video cameras, and real-time surveillance systems.

Accordingly, in order to accomplish the above objects, the present invention provides a method of optimizing a compression of a still image in JPEG 2000 format, comprising the steps of:

(a) dividing an image into a predetermined numbers of tiles each having a predetermined numbers of tile pixels;

(b) decomposing each of the tiles into a predetermined number of subbands by Discrete Wavelet Transform (DWT);

(c) partitioning each of the subbands into a predetermined number of code-blocks;

(d) minimizing a total rate with given predetermined total distortion of image so as to pre-determine an optimal truncation point for each of the code-blocks;

(e) truncating a predetermined part of said DWT coefficient for each of the code blocks; and (f) encoding each of the code-blocks by embedded block-coding to form an embedded code-stream having a plurality of coding passes.

These and other objectives, features, and advantages of the present invention will become apparent from the following detailed description, the accompanying drawings, and the appended claims.

DETAILED DESCRIPTION OF THE PREFERRED EMBODIMENT

Figure 1:
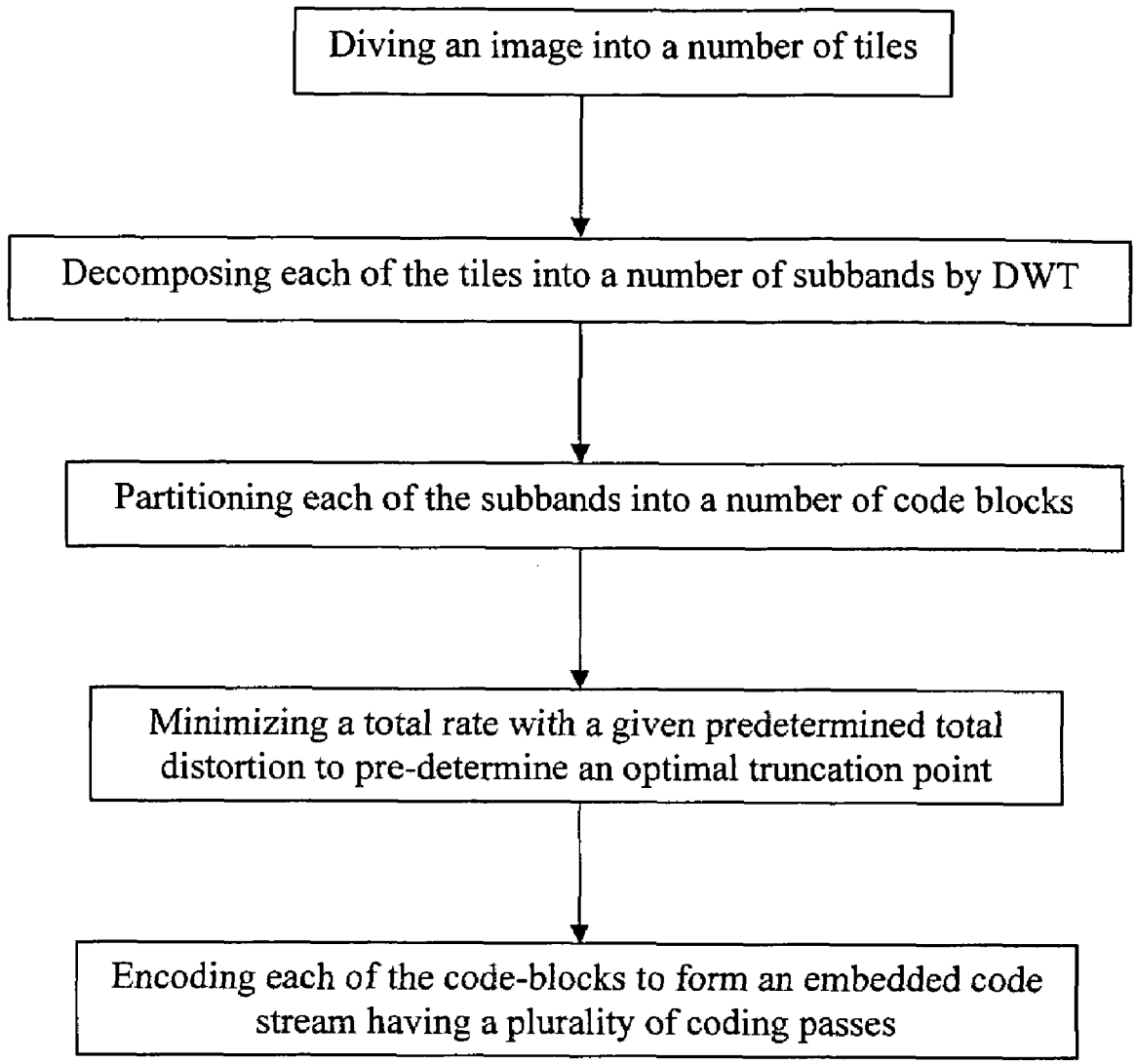
FIG. 1 is a flow diagram of the method of the optimization method according to a preferred embodiment of the present invention.
Figure 2:
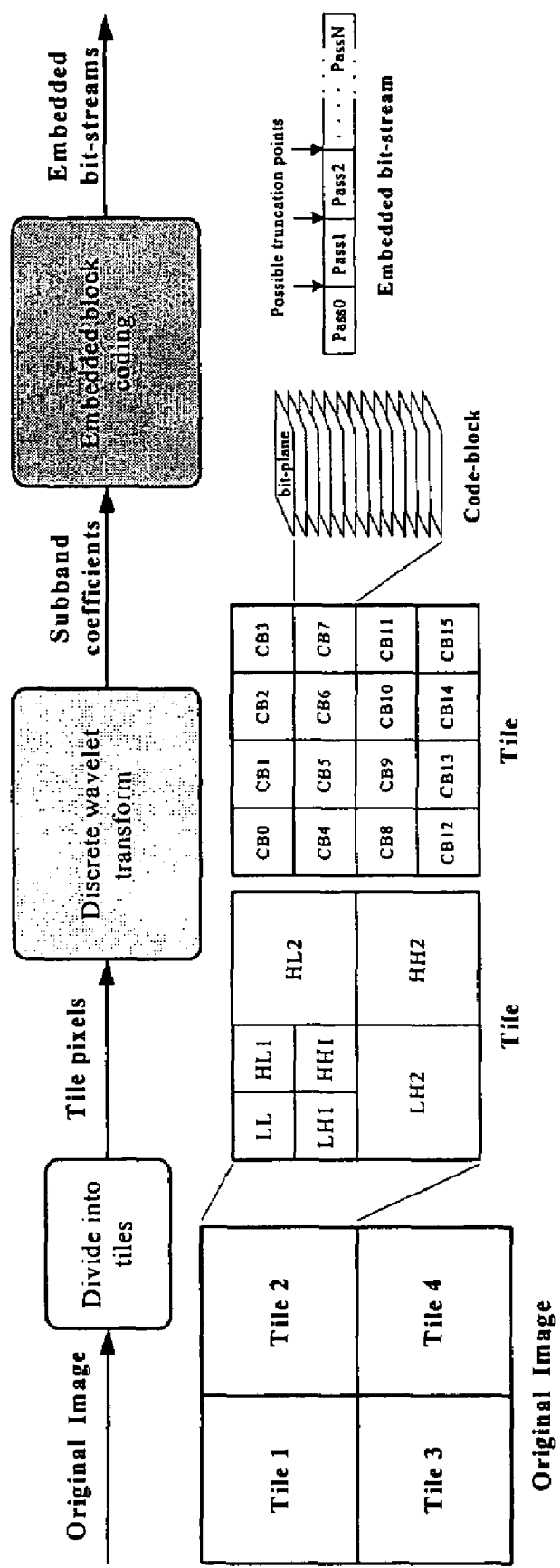
FIG. 2 is a schematic diagram of the method of the optimization method according to the above preferred embodiment of the present invention.

Referring to FIG. 1 to FIG. 2 of the drawings, a method of performing optimized compression of a still image in Joint Photographic Experts Group (JPEG) 2000 format is illustrated, in which the optimizing method comprises the steps of:

(a) dividing an image into a predetermined numbers of tiles each having a predetermined numbers of tile pixels;

(b) decomposing each of the tiles into a predetermined number of subbands by Discrete Wavelet Transform (DWT);

(c) partitioning each of said subbands into a predetermined number of code-blocks which are arranged into a plurality of bit-planes respectively;

(d) minimizing a total rate with given predetermined total distortion of image so as to pre-determine an optimal truncation point for each of the code-blocks;

(e) truncating a predetermined part of DWT coefficients for each of the code-blocks; and (f) encoding each of said code-blocks by embedded block-coding to form an embedded code-stream having a plurality of coding passes.

In order to generate the JPEG 2000 image as a whole from the decomposed titles, the optimization method further comprises a step (g) of combining all of the embedded code-streams to generate an image of JPEG 2000 standard compatible format.

In step (f) above, each of the code-blocks is coded to form an embedded code stream comprising several coding passes, which are embodied as a significant propagation pass ($P_1$), a magnitude refinement pass ($P_2$), and a cleanup pass ($P_3$). During a typical JPEG2000 compression process, there exist three passes in each of the bit-planes which possesses different properties.

When a particular code block i is truncated at a pre-determined feasible truncation point $n_i$ to yield a distortion $D_i^{n_i}$, which is measured by Mean Square Error (MSE), the total distortion of the code stream is:

$$D = \sum_i D_i^{n_i}$$

The rate corresponding to $n_i$ in a particular code block i is denoted by $R_i^{n_i}$. The total rate of the code stream is therefore:

$$R = \sum_i R_i^{n_i}$$

In step (d) above, the optimization of R and D are performed by means of a Lagrange multiplier in pre-compression scheme through a numerical optimization method, wherein the Lagrange multiplier is utilized as a threshold for determining an optimized R and D.

For post-compression rate-distortion scheme, literature has proved that it is impossible to lower D without increasing R or vice versa. For rate control, the goal is to minimize the distortion while keeping the rate of the code-stream equals a target bit rate $R_T$. The problem may be mapped into Lagrange optimization problem as a minimization of:

$$D + \lambda R = \sum_i (D_i^{n_i} + \lambda R_i^{n_i}),$$

where $\lambda$ is the Lagrange multiplier of the relationship between D and R in question.

An R-D slope for a code-block at each potential truncation point n is defined as $$S_i^n = \frac{\Delta D_i^n}{\Delta R_i^n} = \frac{D_i^{n-1} - D_i^n}{R_i^n - R_i^{n-1}}$$

With the increase of n, the potential truncation points will be from the most bit-plane to the least bit-plane. Therefore, the slope must decrease monotonically, that is, the value of $S_i^n$ must be larger than $S_i^{n+1}$. From conventional numerical methods theory, slope threshold $\lambda$ and set of truncation z are optimal (which is denoted by $\lambda^*$ and $z^*$) if the following conditions are satisfied for all code-blocks:

$$\begin{cases} S_i^n \geq \lambda^*, & n \leq n_i \\ S_i^n < \lambda^*, & n > n_i \end{cases} \forall n_i \in z^*$$

In the above equation, $\lambda^*$ denotes the optimal Lagrange multiplier for obtaining the optimal set of truncation points $z^*$.

Alternatively, in addition to rate control, one may minimize the total rate, $R_T$ at a target distortion $D_T$. As in the above mentioned rate control, the R-D optimization can be achieved by minimizing:

$$R + \lambda' D = \sum_i (R_i^{n_i} + \lambda' D_i^{n_i})$$

in which $\lambda'$ is the Lagrange multiplier for optimizing R by fixing the distortion D at the target distortion $D_T$.

One skilled in the art would appreciate that the above-mentioned $\lambda'$ and $\lambda$ are related by $$\lambda = \frac{1}{\lambda'}$$

so that $$\min(R + \lambda' D) = \min\left(\lambda'\left(\frac{1}{\lambda'} R + D\right)\right) = \lambda' \min(D + \lambda R).$$

Note that the optimal truncation point set of rate control problem that resulting the distortion D is the same as the distortion control problem with $D_T = D$. Furthermore, the resulting rate R of distortion control will be the same as the rate constraint $R_T$ of the rate control problem. The set of truncation points $z^*$ are the same for rate control and distortion control.

In pre-compression rate-distortion optimization scheme, the distortion of image is controlled. Thus, step (d) above comprises the steps of:

(d.1) determining a distortion and a rate of each potential truncation point of each of the code-blocks;

(d.2) computing a slope value of each potential truncation point by the distortion and the rate of each potential truncation point; and (d.3) choosing a threshold for minimizing the total rate with a given total distortion.

During a typical JPEG 2000 compression process, there exist three passes in each of bit-plane which possesses different properties, namely the significant propagation pass ($P_1$), the magnitude refinement pass ($P_2$), and the cleanup pass ($P_3$). Each pass is potentially a truncation point of a code-block. To perform distortion control before compression, the total bit rate and the distortion are determined at the outset before compression such that slope threshold may be determined in order to obtain the optimal truncation points. The algorithm is explained as follows:

According to the preferred embodiment of the present invention, a sample coefficient from the original image must be check whether or not it belongs to $P_2$.

Let $\mu^k$ be the sample bit at k-th bit-plane of a j-th coefficient $\mu$, and n be a potential truncation point. Let $\phi^k$ belongs to $P_2$ or not, which can be found as:

$$\phi^k = \begin{cases} 1, & 2^{k+1} \le \mu \\ 0, & 2^{k+1} > \mu \end{cases}$$

Moreover, let $t^k$ be the value of $\mu$ lower than k-th bit-plane, which is the value of the truncated part. The bit-plane delta distortion for a coefficient belonging to the potential truncated point $n \in P_2$ at a bit-plane k is:

$$\Delta d_j^n = \begin{cases} (t^{k+1} - 2^k)^2 - (t^k - \tilde{t}^k)^2, & \phi^k = 1 \\ 0, & \phi^k = 0 \end{cases}$$

The bit-plane delta distortion for the coefficient of potential truncation point $n \in (P_1$ or $P_3)$ at bit-plane k is:

$$\Delta d_j^n = \begin{cases} 0, & \phi^k = 1 \\ (t^{k+1} - 2^k)^2 - (t^k - \tilde{t}^k)^2, & \phi^k = 0 \cap u^k = 1 \\ (t^k)^2, & \phi^k = 0 \cap u^k = 0 \end{cases}$$

where $\tilde{t}^k$ is the reconstructed value of $t^k$ and is given by:

$$\tilde{t}^k = \begin{cases} 2^{k-1}, & k > 0 \\ 0, & k = 0 \end{cases}$$

and the total delta distortion $\Delta D_i^{n_i}$ can be given by:

$$\Delta D_i^{n_i} = \sum_{j=0}^{N^2-1} \Delta d_j^n$$

where N is the code-block size.

Figure 3:
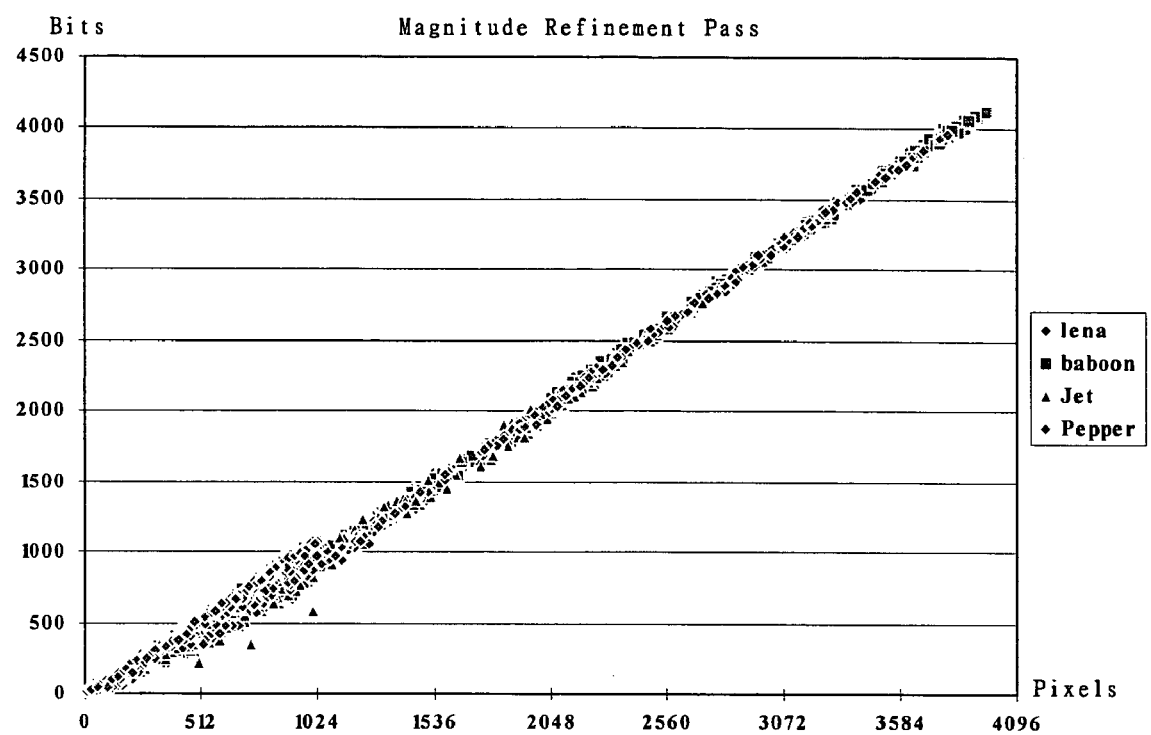
FIG. 3 is a schematic diagram illustrating a randomness property of the magnitude refinement pass ($P_2$) according to the above preferred embodiment of the present invention.

In order to select the optimized truncation points before compression, the slope of each potential truncation point must be estimated. According to the preferred embodiment, the randomness feature of sample coefficients in $P_2$ is utilized to estimate the rate, as shown in FIG. 3 of the drawings. However, it is worth mentioning empirical results reveal that the compression ratio for $P_2$ is approximately 1.

Referring to FIG. 3 of the drawings, each point represents one $P_2$ bit-stream and the x-axis and y-axis is the number of sample coefficient and the resulting rate respectively. It is obvious that the compression ratio of $P_2$ is almost constant regardless of different image types, subbands, code-block sizes and which bit-plane it belongs to. Therefore, the rate of $P_2$ is capable of being accurately estimated. In order to increase the number of feasible truncation points, the propagation property of $P_1$ is utilized. In the lowest two bit-planes among all the code-blocks, most of coefficient has been significant, and therefore almost all the non-significant sample coefficients are propagated in $P_1$.

As can be seen, almost all the non-significant sample coefficients are propagated in $P_1$ for the lowest two bit-planes. The delta rate of the truncation point at bit-plane k for $n \in P_2$ is estimated as $$\Delta r_j^n = \begin{cases} 1, & \phi^k = 1 \\ 0, & \phi^k = 0 \end{cases}$$

Moreover, the total delta rate of the potential truncation point for $n \in P_1$ is estimated as:

$$\Delta R_j^n = \begin{cases} \omega_{P_2} \times BC_i^n, & n \in P_2 \\ \omega_{P_1} \times BC_i^n, & n \in P_1 \cap k < 2 \\ \infty, & \text{otherwise} \end{cases}$$

and $$BC_i^n = \sum_{j=0}^{N^2-1} \Delta r_j^n$$

where $\omega_{P_1}$ and $\omega_{P_2}$ are the empirically decided compression ratio of $P_2$ and $P_1$ of the lowest two bit-planes respectively, and $BC_i^n$ is the bit-counts of the potential truncation point n.

In order to accumulate distortion and rate for each particular bit-plane for determining total delta distortion and total delta rate, $\Delta D_i^n$ and $\Delta BC_i^n$ are set to 0 initially for j=0. To get $\Delta R_i^n$ and $\Delta D_i^n$, $\Delta d_j^n$ and $\Delta r_j^n$ are accumulated with:

$$\Delta D_i^n = \Delta D_i^n + \Delta d_j^n$$

$$\Delta BC_i^n = \Delta BC_i^n + \Delta r_j^n$$

$$j = j+1$$

for all feasible potential truncation points n. If $j = N^2 - 1$ at the end of one code-block, the $\Delta BC_i^n$ must be multiplied with $\omega_{P_1}$ and $\omega_{P_2}$ to get $\Delta R_i^n$, and $\Delta R_i^n$ and $\Delta D_i^n$ for code-block i are obtained.

Finally, the slope for all code-blocks i are calculated by using $\Delta R_i^n$ and $\Delta D_i^n$. The target distortion of the image is averagely distributed into every tile and the distortion of every tile is pre-set at $D_T$. The slope threshold value $\lambda'$ is adjusted so that an optimized value could be obtained without the distortion in a tile exceeding $D_T$. After that, the optimal truncation points $n_i$ for every code-block may be found. The unnecessary parts of DWT coefficients are truncated according to the truncation of each of the code-blocks. Afterwards, the compression process may be performed without processing the truncated parts and therefore, the computing resource is minimized significantly at the same time.

To summarize the above algorithm, the step (d.1) comprises the steps of:

(d.1.1) checking whether a bit at every bit-plane of a particular sample coefficient obtained by DWT falls into $P_2$;

(d.1.2) classifying the bits which do not fall into $P_2$ at lowest two bit-planes into $P_1$ (d.1.3) estimating a magnitude refinement pass ($P_2$) delta distortion $\Delta d_j^n$ for $P_2$ at the bit-plane where the bit of sample coefficient falls into $P_2$;

(d.1.4) estimating a significant propagation pass ($P_1$) delta distortion $\Delta d_j^n$ at lowest two bit-planes where the bit of sample coefficient falls into the $P_1$;

(d.1.5) estimating a magnitude refinement pass ($P_2$) delta rate $\Delta r_j^n$ at the bit-planes where the bit of sample coefficient falls $P_2$;

(d.1.6) estimating a significant propagation pass ($P_1$) delta rate $\Delta r_j^n$ at lowest two bit-planes where the bit of sample coefficient falls into $P_1$; and (d.1.7) accumulating the delta distortion $$\left( \Delta D_i^{n_i} = \sum_{j=0}^{N^2-1} \Delta d_j^n \right)$$

and delta rate $$BC_i^n = \sum_{j=0}^{N^2-1} \Delta r_j^n$$

for $P_1$ in the lowest two bit-planes and $P_2$ in all bit-planes to form the total delta distortion and total bit-plane delta rate.

In other words, one may logically appreciate that step (d.1) further comprises a step (d.1.8) of repeatedly estimating total delta distortion and total bit-plane delta rate of $P_1$ in lowest two bit-planes and $P_2$ in all bit-planes and a step (d.1.9) of multiplying the total delta rate with compression gain of $P_1$ in lowest two bit-planes and $P_2$ in all bit-planes to get adjusted total delta rate $\Delta R_j^n$.

Figure 4:
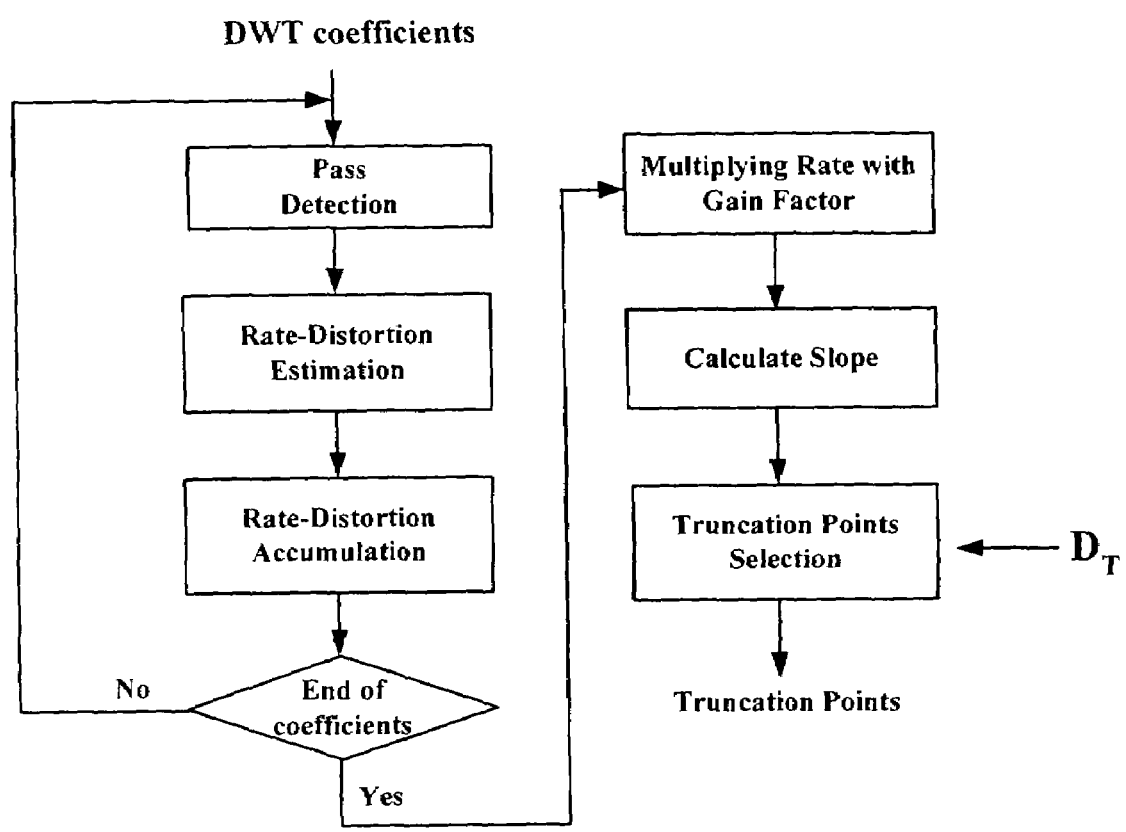
FIG. 4 is a flow diagram of the method of the pre-determination of the truncation points for each of the code-blocks according to the above preferred embodiment of the present invention.

After estimating $\Delta R_i^n$ and $\Delta D_i^n$, the slope of distortion to bit rate can be estimated and the slope threshold would then be optimized for fitting an appropriate Lagrange multiplier in order to get the optimized truncation points. The above methods are summarized in FIG. 4.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of optimizing compression of a still image in JPEG 2000 format, comprising the steps of:
   (a) dividing an image into a predetermined numbers of tiles each having a predetermined numbers of tile pixels;
   (b) decomposing each of said tiles into a predetermined number of subbands by Discrete Wavelet Transform (DWT);
   (c) partitioning each of said subbands into a predetermined number of code-blocks which are arranged into a plurality of bit-planes respectively;
   (d) optimizing a total rate with a given predetermined total distortion of the image so as to pre-determine an optimal truncation point for each of said code-blocks, wherein step (d) comprises:
      (d.1) determining a distortion and a rate of each potential truncation point of each of said code-blocks,
      (d.2) computing a slope value of each potential truncation point by said distortion and said rate of each potential truncation point, and
      (d.3) choosing a threshold for optimizing said total rate with a given total distortion;
   (e) truncating a predetermined part of said DWT coefficients for each of said code-blocks for minimizing computing resources; and
   (f) encoding each of said code-blocks by embedded block-coding to form an embedded code-stream having a plurality of coding passes.

2. The optimization method, as recited in claim 1, wherein in said step (e), said coding passes are a significant propagation pass, a magnitude refinement pass, and a cleanup pass respectively.

3. The optimization method, as recited in claim 2, wherein said step (d.1) propagation pass comprises the steps of:
   (d.1.1) checking whether a bit at every bit-plane of a particular sample coefficient obtained by said Discrete Wavelet Transform falls into a magnitude refinement pass;
   (d.1.2) classifying bits which do not fall into said magnitude refinement pass at the lowest two bit-planes into said significant propagation pass;
   (d.1.3) estimating a magnitude refinement pass delta distortion at all of said bit-planes where said bit sample coefficient falls into said magnitude refinement pass;
   (d.1.4) estimating a significant propagation pass delta distortion at the lowest two of said bit-planes where said bit sample coefficient falls into said significant propagation pass;
   (d.1.5) estimating a magnitude refinement pass delta rate at all of said bit-planes where said bit sample coefficient falls into the magnitude refinement pass;
   (d.1.6) estimating a significant propagation pass delta rate at the lowest of said two bit-planes where said bit sample coefficient falls into said significant; and
   (d.1.7) accumulating said delta distortion and delta rate for all of said significant propagation pass in said lowest two bit-planes and said magnitude refinement pass in all of said bit-planes to form said total delta distortion and said total bit-plane delta rate.

4. The optimization method, as recited in claim 3, wherein said step (d.1) further comprises a step (d.1.8) of repeatedly estimating said total delta distortion and said total bit-plane delta rate of said significant propagation pass in the lowest of said two bit-planes and said magnitude refinement pass in all of said bit-planes.

5. The optimization method, as recited in claim 4, wherein said step (d.1) further comprises a step (d.1.9) of multiplying said total delta rate with a compression gain of said significant propagation pass in said lowest two bit-planes and magnitude refinement pass in said all bit-planes to get an adjusted total delta rate.

6. The optimization method, as recited in claim 5, wherein in said step (d.2), said slope value of each of said potential truncation points is estimated by reference to said total delta distortion and said total bit-plane delta rate using a Lagrange numerical method.

7. The optimization method, as recited in claim 6, further comprising a step (g) of combining all of said embedded code-streams to generate an image of said JPEG 2000 format.

8. The optimization method, as recited in claim 6, wherein in said step (d.3), said threshold is a Lagrange multiplier for obtaining an optimal set of said truncation points with said slope value.

9. The optimization method, as recited in claim 8, wherein said optimal slope value is obtained by fixing a target distortion so as to optimize said total rate.

10. The optimization method, as recited in claim 8, wherein said optimal slope is obtained by fixing a target rate so as to optimize said total distortion.

11. The optimization method, as recited in claim 5, wherein in said step (d.3), said threshold is a Lagrange multiplier for obtaining an optimal set of said truncation points with said slope value.

12. The optimization method, as recited in claim 11, wherein said optimal slope value is obtained by fixing a target distortion so as to optimize said total rate.

13. The optimization method, as recited in claim 11, wherein said optimal slope is obtained by fixing a target rate so as to optimize said total distortion.

14. The optimization method, as recited in claim 1, wherein in said step (d.2), said slope value of each of said potential truncation points is estimated by reference to said total delta distortion and said total bit-plane delta rate using a Lagrange numerical method.

15. The optimization method, as recited in claim 14, further comprising a step (g) of combining all of said embedded code-streams to generate an image of said JPEG 2000 format.

16. The optimization method, as recited in claim 1, further comprising a step (g) of combining all of said embedded code-streams to generate an image of said JPEG 2000 format.

17. The optimization method, as recited in claim 1, wherein in said step (d.3), said threshold is a Lagrange multiplier for obtaining an optimal set of said truncation points with said slope value.

18. The optimization method, as recited in claim 17, wherein said optimal slope value is obtained by fixing a target distortion so as to optimize said total rate.

19. The optimization method, as recited in claim 17, wherein said optimal slope is obtained by fixing a target rate so as to optimize said total distortion.

* * * * *